United States Patent [19]

Jidai et al.

[11] 4,048,379

[45] Sept. 13, 1977

[54] WATER-DISPERSION VARNISH FOR ELECTRODEPOSITION

[75] Inventors: Eiki Jidai; Hiroshi Ono; Kyoichi Shibayama, all of Amagasaki, Japan

[73] Assignee: Mitsubishi Denki Kabushiki Kaisha, Tokyo, Japan

[21] Appl. No.: 571,054

[22] Filed: Apr. 24, 1975

[30] Foreign Application Priority Data

May 2, 1974  Japan .................................. 49-49929
May 9, 1974  Japan .................................. 49-51979

[51] Int. Cl.$^2$ .......................................... C08F 220/46
[52] U.S. Cl. .................................... 428/500; 428/522; 428/463; 260/29.6 AN; 260/29.6 T; 204/181; 526/271; 526/303; 526/329.3; 526/320
[58] Field of Search ............... 260/29.6 AN; 428/500, 428/522, 463; 204/181

[56] References Cited

U.S. PATENT DOCUMENTS

| 2,868,738 | 1/1959 | Hwa | 260/79.3 MN |
|---|---|---|---|
| 3,503,918 | 3/1970 | Le Sota | 260/29.6 AN |
| 3,781,248 | 12/1973 | Sakai et al. | 260/29.6 AN |

Primary Examiner—Ralph S. Kendall
Attorney, Agent, or Firm—Oblon, Fisher, Spivak, McClelland & Maier

[57] ABSTRACT

Acrylonitrile, an acrylic ester such as ethyl acrylate, n-propyl acrylate, n-butyl acrylate, isopropyl acrylate, n-hexyl acrylate and the like are copolymerized with a cross-linkable monomer, an unsaturated organic acid and a vinyl monomer in a one-step or two-step operation to prepare a water-dispersion varnish for electrodeposition which has excellent dispersion stability and gives a coated film having excellent scrape abrasion resistance and high cut-through temperature.

5 Claims, No Drawings

WATER-DISPERSION VARNISH FOR ELECTRODEPOSITION

BACKGROUND OF THE INVENTION

1. Field of the Invention

The present invention relates to a water-dispersion varnish for electrodeposition.

2. Description of the Prior Art

Heretofore, metal surfaces have been coated with an organic film which is electrically insulating, anti-corrosive or resistant to mechanical damage, by methods such as a tumbling coating method, an electrostatic coating method or an electrodeposition coating method. Among these coating methods, the electrodeposition coating method has many significant advantages: high efficiency of use of the varnish employed; shortening of the total time required for the process; ease of automation; and production of a coated film having no pin-holes. Moreover, the troublesome considerations of safety and hygiene are not a problem because no organic solvent is used. Accordingly, the electrodeposition coating method has been widely used for preparation of enameled wires.

The varnishes used for electrodeposition can be classified as: (1) a water-soluble type varnish for formation of a coated film prepared by dissolving compounds having molecular weights less than several thousands and having dissociating groups and (2) a water-dispersion varnish for formation of a coated film prepared by dispersing a polymer into water as fine particles. When the water-soluble type varnish is used, uniform deposition can be attained on the entire surface including that portion of the surface residing in a gap of a complicated shape. However, the thickness of the film formed by the electrodeposition is only several tens $\mu$m. Accordingly, pin-holes are easily formed when using certain varnishes. Moreover, the electric insulating property of the coated film is quite low because of the dissociating groups introduced into the polymer in order to impart water solubility. That is, in the water-soluble type varnish, the compound employed has dissociating groups which dissolve as electrolytes in the water, whereby the coated film prepared from the varnish has inferior electric characteristics and is unsatisfactory as an electrical insulating film.

On the other hand, the water-dispersion varnish has a relatively poor covering performance. It is difficult to form a uniform film on a surface having a complicated shape. However, it has many offsetting advantages, namely: a thickly coated film can be deposited easily in a short time; the number of dissociating groups is small; and polymers having high molecular weights can be used so as to form a coated film having excellent mechanical properties, chemical resistance, water resistance, and electrical characteristics such as volume resistivity and breakdown voltage. Accordingly, in preparations of enameled wires by forming a coated film on a bare copper wire by the electrodeposition, the latter water-dispersion type varnish principally has been used. However, since the resultant enameled wire must simultaneously possess many different characteristics in the coated film such as uniformly good appearance with no swelling or cracking, excellent scrape abrasion resistance, high cut-through temperature, appropriate volume resistivity and mechanical characteristics and high chemical resistance, it has been very difficult to apply electrodeposition using a water-dispersion varnish. This occurs because it is difficult to select components, appropriate ratios of the components and polymerization conditions for the preparation of the water-dispersion varnish which can produce the desired result. Accordingly, a water-dispersion varnish suitable for preparing an enambled wire having all of the above-mentioned satisfactory characteristics has not been known. Consequently, it would be most desirable to have such a varnish which produces a coating possessing all these desirable properties simultaneously.

SUMMARY OF THE INVENTION

Accordingly, it is an object of the present invention to provide a water-dispersion varnish for electrodeposition which forms a coated film having excellent scrape abrasion resistance and high cut-through temperature.

It is another object of this invention to provide a process for preparing the water-dispersion varnish for electrodeposition.

It is still another object of this invention to provide a coated product having high scrape abrasion resistance and high cutthrough temperature.

Briefly, these and other objects of the present invention, which shall become clearer by the discussion below, have been attained by providing a water-dispersion varnish for electrodeposition which is prepared by copolymerizing acrylonitrile, an acrylic ester, a cross-linkable monomer, an organic acid having at least one double bond and a vinyl monomer in a one-step or two-step operation.

DETAILED DESCRIPTION OF THE PREFERRED EMBODIMENTS

Acrylonitrile is included in order to improve the scrape abrasion resistance, cut-through temperature, heat resistance and chemical resistance of the coated film. The acrylic ester is included to improve the crazing resistance, and flexibility (bendability) of the coated film. The vinyl monomer such as styrene, $\alpha$-methyl styrene, methyl methacrylate or vinyl acetate is included to improve the polymerization stability and also the heat resistance and cut-through temperature of the coated film. The cross-linkable monomer such as glycidyl methacrylate, N-methylol acrylamide, allyl glycidyl ether, methacrylamide or acrylamide is included for cross-linking of the copolymer in order to improve the scrape abrasion resistance, cut-through temperature, chemical resistance and mechanical strength of the coated film. The organic acid having at least one double bond such as acrylic acid, methacrylic acid or maleic anhydride is included to improve the electrodeposition performance of the water dispersion varnish and also to improve the appearance of the coated film.

Suitable acrylic esters include ethyl acrylate, n-propyl acrylate, n-butyl acrylate, isopropyl acrylate, n-hexyl acrylate and the like. Suitable monomers for cross-linking include glycidyl methacrylate, N-methylolacryl amide, allyl glycidyl ether, methacrylamide, acrylamide and the like. Suitable vinyl monomers include styrene, methyl methacrylate, $\alpha$-methyl styrene, vinyl acetate and the like. Suitable organic acids having at least one double bond include methacrylic acid, acrylic acid, maleic anhydride and the like. The five components are preferably combined in the following proportions: 20 – 75 wt. %, preferably 30 – 65 wt. %, of acrylonitrile; 3 – 40 wt. %, preferably 5 – 30 wt. %, of acrylic ester; 10 – 45 wt. %, preferably 15 – 35 wt. %, of the vinyl monomer; 1 – 15 wt. %, preferably 2 – 10 wt. %, of the cross-linkable monomer; and 1 – 15 wt. %, preferably 2 – 8 wt. %, of the organic acid. These components can be copolymerized in a one-step or two-step operation. The copolymerization is preferably conducted by emulsion polymerization effected by emulsifying the monomers with an emulsifier and a polymerization initiator such as a persulfate. Appropriate conditions for the emulsion polymerization are selected by conventional procedures known to persons skilled in the art. The film coated by using the water-dispersion varnish prepared by copolymerizing the components in one-step or two-step operation, has excellent scrape abrasion resistance, cut-through temperature, flexibility and other film characteristics.

In the invention, it is preferred to prepare the water-dispersion varnish by emulsion polymerization of the five components in the above-listed proportions. For example, when the content of acrylonitrile is higher than said range, the polymerization stability and the flexibility of the coated film are inferior. On the other hand, when the content of acrylonitrile is lower than said range, the scrape abrasion resistance and chemical resistance of the coated film are inferior. When the content of the acrylic ester is higher than said range, the scrape abrasion resistance and cut-through temperature of the coated film are inferior. On the other hand, when the content of the acrylic ester is lower than said range, the scrape abrasion resistance and crazing resistance are inferior. When the content of the vinyl monomer is higher than said range, the flexibility of the coated film and sometimes the chemical resistance of the coated film are inferior. When the content of the vinyl monomer is lower than said range, the polymerization stability of the varnish is inferior. When the content of the cross-linkable monomer is higher than said range, the flexibility of the coated film and the crazing resistance are inferior. When the content of the cross-linkable monomer is lower than said range, the cross-linking density of the coated film is insufficient, thereby producing inferior scrape abrasion resistance, cut-through temperature, chemical resistance and mechanical strength. When the content of the organic acid is higher than said range, the breakdown voltage and volume resistivity of the coated film are inferior. When the content of the organic acid is lower than said range, the electrodeposition performance and the appearance of the coated film are inferior.

The copolymerization of the components in the proportions in accordance with the invention can be conducted by one-step or two-step operation. The one-step operation has advantages in that it enables preparation of a uniform product having uniform properties. The two-step operation involves first polymerizing some of the components and then polymerizing the remaining components added all at once or slowly. The resulting product includes polymers having two parts each containing different components. The characteristics of the product are different from those of the product prepared by one-step operation. Although the operation is complicated and is not simple, it advantageously provides a product having special characteristics. In the two-step copolymerization of the present invention, it is preferred to first polymerize the soft components having a $T_g$ lower than room temperature, and then, to copolymerize the hard components having a $T_g$ higher than room temperature. The ratio of the soft component to the hard component can be reduced while still forming a coated film having the same flexibility in accordance with the two-step copolymerization. Accordingly, it is possible to form a coated film having higher scrape abrasion resistance and cut-through temperature when the components are copolymerized by this two-step operation.

In the process of the invention, the monomer components at the proper proportions, an emulsifier, a polymerization initiator and water are charged into a reactor. The mixture is heated with stirring to copolymerize the monomer components. It is preferred to copolymerize them with a reaction temperature of 50°–90° C in the period of 1–10 hours. Suitable emulsifiers include a nonionic, anionic or cationic surfactant and mixtures thereof. The emulsifier preferably includes an anionic surfactant in view of superior electrodeposition performance of the resulting water-dispersion varnish. Suitable polymerization initiators include an organic perioxide, an inorganic peroxide, an azo compound, and, preferably, potassium persulfate because of the resultant stability of the resulting water-dispersion varnish.

Having generally described the invention, a more complete understanding can be obtained by reference to certain specific Examples, which are included for purposes of illustration only and are not intended to be limiting unless otherwise specified.

REFERENCE EXAMPLE 1

In a reactor, 380 g of deionized water was charged and nitrogen gas was bubbled through the water in order to displace the dissolved oxygen. Then, 45 g of styrene, 20 g of acrylonitrile, 25 g of ethyl acrylate, 5 g of glycidyl methacrylate, 5 g of methacrylic acid and 1 g of sodium laurylsulfate were charged into the reactor. The mixture was heated to 70° C and then a solution of 0.3 g of potassium persulfate and 0.1 g of sodium hydrogensulfite in 20 g of deionized water was added to the mixture. The mixture was heated at 70° C for 3 hours to prepare a water-dispersion varnish. The water-dispersion varnish was used for electrodeposition on a bare copper wire having a diameter of 1 mm. The coated wire was immersed into dimethylformamide for several seconds and then was dried at 80° C for 30 minutes. It then was cured at 180° C for 3 hours. The coated film had low scrape abrasion resistance, a low cut-through temperature and low chemical resistance.

REFERENCE EXAMPLE 2

In accordance with the process of Reference Example 1, a water-dispersion varnish was prepared by copolymerizing 40 wt. parts of acrylonitrile, 10 wt. parts of styrene, 40 wt. parts of ethyl acrylate, 5 wt. parts of glycidyl methacrylate and 5 wt. parts of methacrylic acid with an emulsifier. The coated film prepared by using the water-dispersion varnish in accordance with the process of Reference Example 1 had low scrape abrasion resistance, a low cut-through temperature and low thermal shock.

REFERENCE EXAMPLE 3

In accordance with the process of Reference Example 1, 10 wt. parts of ethyl acrylate, 1 wt. part of glycidyl methacrylate, and 1 wt. part of methacrylic acid were reacted at 70° C for 30 minutes. A mixture of 70 wt. parts of acrylonitrile, 10 wt. parts of styrene, 4 wt. parts of glycidyl methacrylate and 4 wt. parts of methacrylic acid was added dropwise. Then, they were copolymerized at 70° C. After about 1 hour, the mixture was coagulated while losing stability. A water-dispersion varnish was not obtained.

EXAMPLE 1

In a reactor, 380 g of deionized water was charged and nitrogen was bubbled through water in order to displace the dissolved oxygen. 50 g of acrylonitrile, 20 g of styrene, 20 g of ethyl acrylate, 5 g of glycidyl methacrylate, 5 g of methacrylic acid and 1 g of sodium lauryl sulfate were charged into the reactor. The mixture was heated to 70° C, and then a solution of 0.3 g of potassium persulfate and 0.1 g of sodium hydrogen sulfite in 20 g of deionized water was added to the mixture. The mixture was reacted at 70° C for 3 hours to prepare a water-dispersion varnish. The coated film prepared by electrodeposition of the varnish and a curing thereof in accordance with the process of Reference Example 1 had excellent scrape abrasion resistance, a high cut-through temperature and balanced characteristics. It produced an excellent coated film for an enameled wire.

EXAMPLE 2

In accordance with the process of Example 1, a water-dispersion varnish was prepared by emulsion-copolymerization of 30 wt. parts of acrylonitrile, 30 wt. parts of ethyl acrylate, 30 wt. parts of methyl methacrylate, 8 wt. parts of glycidyl methacrylate and 2 wt. parts of methacrylic acid, with an emulsifier of sodium dodecylbenzene sulfonate. The coated film prepared by using the water-dispersion varnish in accordance with the process of Reference Example 1 had excellent scrape abrasion resistance, high cut-through temperature and other excellent characteristics.

EXAMPLE 3

In accordance with the process of Example 1, a water-dispersion varnish was prepared by an emulsion-copolymerization of 40 wt. parts of acrylonitrile, 18 wt. parts of styrene, 10 wt. parts of methyl methacrylate, 25 wt. parts of ethyl acrylate, 2 wt. parts of glycidylmethacrylate and 5 wt. parts of methacrylic acid with an emulsifier of sodium polyoxyethylenenonyl phenyl sulfate. The coated film prepared by using the water-dispersion varnish in accordance with the process of Reference Example 1, had excellent scrape abrasion resistance, high cut-through temperature and other excellent characteristics.

EXAMPLE 4

In accordance with the process of Example 1, a water-dispersion varnish was prepared by an emulsion-copolymerization of 50 wt. parts of acrylonitrile, 20 wt. parts of ethyl acrylate, 12 wt. parts of α-methylstyrene, 10 wt. parts of N-methylolacrylamide and 8 wt. parts of methacrylic acid with an emulsifier of sodium dioctyl sulfosuccinate and polyoxyethylene nonyl phenyl ether and a polymerization initiator of ammonium persulfate. The coated film prepared by using the water-dispersion varnish in accordance with the process of Reference Example 1, had excellent scrape abrasion resistance, high cut-through temperature and other excellent characteristics.

EXAMPLE 5

In a reactor, 380 g of deionized water was charged and nitrogen gas was bubbled through water in order to displace the dissolved oxygen. Then, 10 g of ethyl acrylate, 1 g of glycidyl methacrylate, 1 g of methacrylic acid and 1 g of sodium lauryl sulfate were charged into the reactor. The mixture was heated to 70° C and a solution of 0.1 g of potassium persulfate and 0.03 g of sodium hydrogensulfite in 10 g of deionized water was added to the mixture and was reacted for 30 min. at 70° C. Then, a solution of 0.3 g of potassium persulphate and 0.1 g of sodium hydrogen sulfite dissolved in 10 g of deionized water was added to the mixture. A mixture of 50 g of acrylonitrile, 30 g of styrene, 4 g of glycidyl methacrylate and 4 g of methacrylic acid was added dropwise during 30 minutes. After the addition, the mixture was reacted at 65° C for 4 hours to prepare a water-dispersion varnish. The coated film prepared by electrodeposition of the varnish and subsequent curing thereof in accordance with the process of Reference Example 1, had excellent scrape abrasion resistance, high cut-through temperature and balanced characteristics for use as an enameled wire.

EXAMPLE 6

In accordance with the process of Example 5, 10 wt. parts of ethyl acrylate, 1 wt. part of glycidyl methacrylate and 1 wt. part of methacrylic acid were reacted at 70° C for 30 minutes. Then, a mixture of 65 wt. parts of acrylonitrile, 15 wt. parts of α-methylstyrene, 4 wt. parts of glycidyl methacrylate and 4 wt. parts of methacrylic acid was added dropwise. They were then copolymerized to prepare a water-dispersion varnish. The coated film prepared by using the water-dispersion varnish in accordance with the process of Reference Example 1, had excellent scrape abrasion resistance, high cut-through temperature and other excellent characteristics.

EXAMPLE 7

In accordance with the process of Example 5, 15 wt. parts of ethyl acrylate, 2 wt. parts of glycidyl methacrylate and 2 wt. parts of methacrylic acid were reacted. A mixture of 40 wt. parts of acrylonitrile, 35 wt. parts of methyl methacrylate, 3 wt. parts of glycidyl methacrylate and 3 wt. parts of methacrylic acid was added dropwise and then they were copolymerized to prepare a water-dispersion varnish. The coated film prepared by using the water-dispersion varnish in accordance with the process of Reference Example 1, had excellent scrape abrasion resistance, high cut-through temperature and other excellent characteristics.

EXAMPLE 8

In accordance with the process of Example 5, 5 wt. parts of ethylacrylate, 1 wt. part of glycidyl methacrylate and 1 wt. part of methacrylic acid were reacted. Then, a mixture of 55 wt. parts of acrylonitrile, 30 wt. parts of vinyl acetate, 4 wt. parts of glycidyl methacrylate and 4 wt. parts of methacrylic acid was added dropwise. They were then copolymerized to prepare a water-dispersion varnish. The coated film prepared by using the water-dispersion varnish in accordance with the process of Reference Example 1, had excellent scrape abrasion resistance, high cut-through temperature, and other excellent characteristics.

EXAMPLE 9

In accordance with the process of Example 5, 5 wt. parts of ethyl acrylate, 5 wt. parts of n-butyl acrylate, 2 wt. parts of glycidyl methacrylate and 2 wt. parts of methacrylic acid were reacted. Then, a mixture of 55 wt. parts of acrylonitrile, 25 wt. parts of α-methyl styrene, 4 wt. parts of N-methylol acrylamide and 2 wt. parts of acrylic acid was added dropwise. They were then copolymerized to prepare a water-dispersion varnish. The coated film prepared by using the water-dispersion varnish in accordance with the process of Reference Example 1, had excellent scrape abrasion resistance, high cut-through temperature, and other excellent characteristics.

The characteristics of the enameled wires prepared by the references and examples are shown in Table 1. It is clear from these results that the coated films of the examples had excellent properties.

TABLE 1

|  |  | Thickness (μm) | Repeated scrape abrasion (times) | Cut-through temperature (° C) | Breakdown voltage in glycerine (KV) | Jerking properties |
|---|---|---|---|---|---|---|
| Reference | 1 | 30 | 10 | 160 | 3.0 | excellent |
| Reference | 2 | 32 | 17 | 170 | 3.0 | inferior |
| Example | 1 | 30 | 45 | 210 | 3.5 | excellent |
|  | 2 | 30 | 35 | 190 | 3.7 | " |
|  | 3 | 30 | 40 | 200 | 3.5 | " |
|  | 4 | 30 | 55 | 215 | 3.5 | " |
|  | 5 | 29 | 70 | 235 | 3.5 | " |
|  | 6 | 33 | 80 | 250 | 3.7 | " |
|  | 7 | 29 | 60 | 230 | 3.3 | " |
|  | 8 | 32 | 75 | 240 | 3.3 | " |
|  | 9 | 30 | 65 | 230 | 3.5 | " |

Having now fully described the invention, it will be apparent to one of ordinary skill in the art that many changes and modifications can be made thereto without departing from the spirit or scope of the invention as set forth herein.

What is claimed as new and intended to be covered by letters patent is:

1. A process for preparing a water-dispersible varnish which can be used for electrodeposition, which consists essentially of:
   copolymerizing from 30-65 weight percent acrylonitrite; from 5-30 weight percent of ethyl acrylate, n-propyl acrylate, n-butyl acrylate, isopropyl acrylate or n-hexyl acrylate; from 2-10 weight percent of glycidyl methacrylate, n-methylol acrylamide, allyl glycidyl ether, methacrylamide or acrylamide, from 2-8 weight percent of acrylic acid, methacrylate acid or maleic anhydride and from 15-35 weight percent of styrene, methyl methacrylate, alpha-methyl styrene or vinyl acetate.

2. The process of claim 1, wherein the copolymerization reaction is effected by first reacting those monomer components which have a Tg less than room temperature and then reacting those components having a Tg at least equal to room temperature.

3. The process of claim 1, wherein all ingredients are reacted in one step.

4. A water-dispersion varnish which is prepared by copolymerization of 30-65 weight percent acrylonitrile; 5-30 weight percent of ethyl acrylate, n-propyl acrylate, n-butyl acrylate, isopropyl acrylate or n-hexyl acrylate; 2-10 weight percent of glycidyl methacrylate, n-methylol acrylamide, allyl glycidyl ether, methacrylamide or acrylamide; 2-8 weight percent acrylic acid, methacrylic acid or maleic anhydride; and 15-35 weight percent of styrene, methyl methacrylate, alpha-methylstyrene or vinyl acetate.

5. A coated product having high scrape abrasion resistance and a high cut-through temperature, wherein the coating, comprises:
   a resin prepared by copolymerizing 30-65 weight percent of acrylonitrile; 5-30 weight percent of ethyl acrylate, n-propyl acrylate, n-butyl acrylate, isopropyl acrylate or n-hexyl acrylate; 2-10 weight percent of glycidyl methacrylate, n-methylol acrylamide, allyl glycidyl ether, methacrylamide or acrylamide, 2-8 weight percent of acrylic acid, methacrylic acid or maleic anhydride and 15-35 weight percent of styrene, methyl methacrylate, alpha-methylstyrene or vinyl acetate.

* * * * *